US009294738B2

(12) United States Patent
Ying et al.

(10) Patent No.: US 9,294,738 B2
(45) Date of Patent: Mar. 22, 2016

(54) SYSTEM AND METHOD OF SECURITY MONITORING

(75) Inventors: Goangshiuan Ying, Oakland, CA (US); Eugene L. Edmon, Danville, CA (US); Kent G. McCammon, Livermore, CA (US); Steve Aspell, Brentwood, CA (US); Ronald Brost, Vacaville, CA (US); Edward Walter, Boerne, TX (US); Steven Michael Wollmershauser, San Antonio, TX (US); Yolius Diroo, San Antonio, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1613 days.

(21) Appl. No.: 11/513,320

(22) Filed: Aug. 30, 2006

(65) Prior Publication Data
US 2008/0055423 A1 Mar. 6, 2008

(51) Int. Cl.
*H04N 7/18* (2006.01)
*G08B 13/196* (2006.01)
*H04N 5/44* (2011.01)
*H04N 7/173* (2011.01)
*H04N 21/2187* (2011.01)
*H04N 21/472* (2011.01)

(52) U.S. Cl.
CPC .......... *H04N 7/186* (2013.01); *G08B 13/19684* (2013.01); *G08B 13/19691* (2013.01); *H04N 5/4403* (2013.01); *H04N 7/17318* (2013.01); *H04N 7/181* (2013.01); *H04N 21/2187* (2013.01); *H04N 21/472* (2013.01); *H04N 21/47202* (2013.01); *H04N 2005/441* (2013.01)

(58) Field of Classification Search
CPC .......... H04N 5/4403; H04N 21/23418; H04N 21/40; H04N 21/42204; H04N 21/42207; H04N 21/43615
See application file for complete search history.

(56) References Cited

U.S. PATENT DOCUMENTS

| 6,366,914 | B1 | 4/2002 | Stern |
| 6,373,817 | B1 | 4/2002 | Kung et al. |
| 6,385,305 | B1 | 5/2002 | Gerszberg et al. |
| 6,553,100 | B1 | 4/2003 | Chen et al. |
| 6,792,615 | B1 | 9/2004 | Rowe et al. |
| 6,826,173 | B1 | 11/2004 | Kung et al. |
| 6,941,576 | B2 | 9/2005 | Amit |
| 6,970,183 | B1 * | 11/2005 | Monroe ........................ 348/143 |
| 7,006,613 | B2 | 2/2006 | Novak et al. |
| 7,015,806 | B2 * | 3/2006 | Naidoo et al. ................ 340/531 |
| 7,023,858 | B2 | 4/2006 | Ozawa et al. |
| 7,069,274 | B2 | 6/2006 | Stern |
| 7,801,964 | B2 * | 9/2010 | Kohavi ........................ 709/211 |
| 2004/0148632 | A1 * | 7/2004 | Park et al. ........................ 725/81 |
| 2004/0249925 | A1 | 12/2004 | Jeon et al. |

(Continued)

OTHER PUBLICATIONS

International Search Report for International Patent No. PCT/US2007/016124, mailed on Feb. 1, 2008.
Written Opinion of the International Searching Authority for PCT/US2007016124, mailed on Feb. 1, 2008.

(Continued)

*Primary Examiner* — Christopher S Kelley
*Assistant Examiner* — Christopher Findley
(74) *Attorney, Agent, or Firm* — Toler Law Group, P.C.

(57) ABSTRACT

A system and method of security monitoring is disclosed. In a particular embodiment, a method includes determining a channel of a television system associated with video content from a security camera. In a particular embodiment, a method includes sending a first alert to a display device and sending a second alert to a remote control device.

28 Claims, 8 Drawing Sheets

(56) References Cited

U.S. PATENT DOCUMENTS

2005/0030977 A1    2/2005  Casey et al.
2005/0218266 A1*  10/2005  Bandy et al. ............... 244/118.5
2005/0281417 A1   12/2005  Toprover
2006/0072622 A1*   4/2006  Cho ............................. 370/486
2007/0018844 A1*   1/2007  Sutardja .................. 340/825.69

OTHER PUBLICATIONS

Michael Gibbs, "Internet Group Management Protocol", Riverstone Networks Advanced Technical Paper Series, Jan. 27, 2003, 30 pages.

"Overview of IP Multicast", http://www.cisco.com, Jul. 26, 2006, 5 pages.

* cited by examiner

SYSTEM AND METHOD OF SECURITY MONITORING

FIELD OF THE DISCLOSURE

The present disclosure relates generally to security monitoring.

BACKGROUND

Security and surveillance systems are becoming increasingly popular for commercial and residential locations. Security systems may provide video signals from surveillance cameras to display monitors. Security systems may also include sensors that may indicate events such as a door opening or a window pane breaking. These sensors may send a signal to a control panel to determine a response to the signal, such as sounding an alarm. Other security systems, such as those used in private communities or multi-dwelling units, may include an entrance or gate access system that allows a visitor to communicate a request for entry to a tenant or security officer via a keypad or other device. However, security systems are frequently prohibitively expensive to install and provide only limited information and communication options. Hence, there is a need for an improved system and method of security monitoring.

DETAILED DESCRIPTION OF THE DRAWINGS

In one embodiment, a security method is disclosed. The security method includes receiving a signal at a multimedia device. The signal indicates a security event. The security method also includes sending a first alert that indicates the security event to a display device coupled to the multimedia device. The security method also includes sending a second alert to a remote control device that is operable to control the multimedia device, where the second alert indicates the security event.

In another embodiment, a method of providing security video data is disclosed. The method includes determining a first channel of an internet protocol television (IPTV) system associated with first security video content from a first security camera. The method also includes receiving a request from a set-top box via an access network of the IPTV system to access security content, where the security content includes the first security video content. The method also includes sending first data identifying the first channel to the set-top box.

In another embodiment, a multimedia device is disclosed. The multimedia device includes a process and a memory device accessible to the processor. The memory device includes instructions executable by the processor to receive a signal indicating a security event. The memory device also includes instructions to send a first alert to a display device coupled to the multimedia device. The first alert indicates the security event. The memory device further includes instructions to send a second alert to a remote control device that is operable to control the multimedia device. The second alert also indicates the security event.

Figure 1:
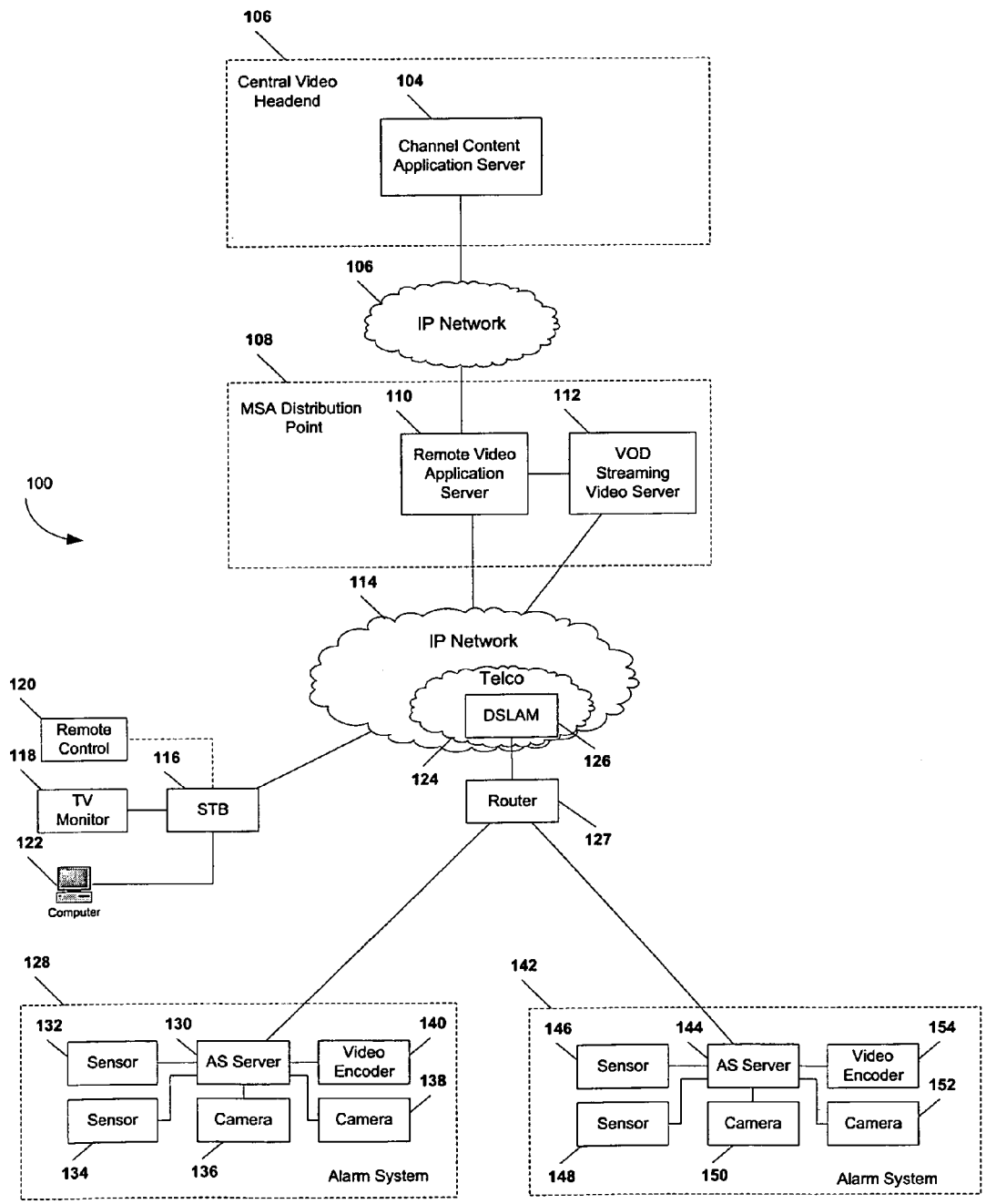
FIG. 1 is a block diagram of a particular illustrative embodiment of system to provide security monitoring.

Referring to FIG. 1, a particular illustrative embodiment of a system to provide security monitoring is depicted and generally designated 100. The system 100 is an Internet Protocol television (IPTV) system that includes a television network central video headend 106 coupled to a metro service area (MSA) distribution point 108 via an internet protocol (IP) network 106. A multimedia device, such as a set-top box (STB) 116, is coupled to the MSA distribution point 108 via a second IP network 114. In a particular embodiment, a first alarm system 128 can be coupled to the second IP network 114 via a router 127 to a digital subscriber line access multiplexer (DSLAM) 126 of a telecommunication company IP network 124. Further, a second alarm system 142 can be coupled to the second IP network 114 via the router 127 and the DSLAM 126.

The central video headend 106 can include a channel content application server 104. In an illustrative embodiment, the channel content application server 104 can be operable to provide channel designations for sources of video to users of the television system, such as a user of the STB 116. The MSA distribution point 108 can include a remote video application server 110 to provide a remote video application to users of the television system, such as the user of the STB 116. The MSA distribution point 108 can also include a video on demand (VOD) streaming video server 112. In an illustrative, non-limiting embodiment, the remote video application server 110 can provide video streams to users of the television system via multicast transmission over the IP network 114, while the VOD streaming video server 112 can provide video streams to users of the television system via unicast transmissions over the IP network 114, such as by replicating the requested video stream to the STB 116.

The first IP network 106 can be a private IP network, a public IP network, such as the Internet, or any combination thereof. Further, the second IP network 114 can be a private network, a public network, such as the Internet, or any combination thereof.

The STB 116 can receive video content from the second IP network 114 and display the video content at a display device 118. The STB 116 can communicate with a remote control device 120. Further, the STB 116 can communicate with a user computer 122.

In a particular embodiment, the first alarm system 128 can include an alarm system server 130 coupled to a first sensor 132 and a second sensor 134. The alarm system server 130 can also be coupled to a first camera 136 and a second camera 138. A video encoder 140 may receive a video signal of the cameras 136, 138 and encode the received video signal for transmission to via the second IP network 114. The alarm system server 130 can further be operable to transmit the encoded video signal to the IP network 114 via the router 127 and the DSLAM 126 of the telecommunication company IP network 124.

In a particular embodiment, the second alarm system 142 may include an alarm system server 144 that is coupled to sensors 146, 148. Additionally, the alarm system server 144 can be coupled to cameras 150, 152. The alarm system 142 can include a video encoder 154 to receive a video output of the cameras 150, 152 and encode the video signal for transmission via the second IP network 114. In a particular embodiment, the video signal is continuously sent to the second IP network 114. In another particular embodiment, the video signal is only sent when a security event is detected, such as when a sensor 146, 148 is activated.

In an illustrative embodiment, a video signal from the alarm system 128 or the alarm system 142 can be received at the MSA distribution point 108 via the second IP network 114. The remote video application server 110 can determine a channel of the IPTV system associated with security video content from the security camera 136. For example, the remote video application server 110 can query the channel content application server 104 for the channel assigned to provide security video content received from the security camera 136. The remote video application server 110 can receive a request from the set-top box 116 to access security content including the video content captured by the camera 136 and received from the alarm system 128

In an illustrative embodiment, the remote video application server 110 can send data identifying the channel associated with the security video content to the set-top box 116. The set-top box 116 can display the data on the display device 118 as a selectable menu item, and the user can choose to receive the security video content by selecting the menu item. Selecting the menu item causes the set-top box 116 to request the video content associated with the channel, and the remote video application server 110 may send the security video data to the set-top box 116 to display. In a particular illustrative embodiment, the set-top box 116 can process instructions to automatically retrieve the video content and display the video content at the display device 118.

Figure 2:
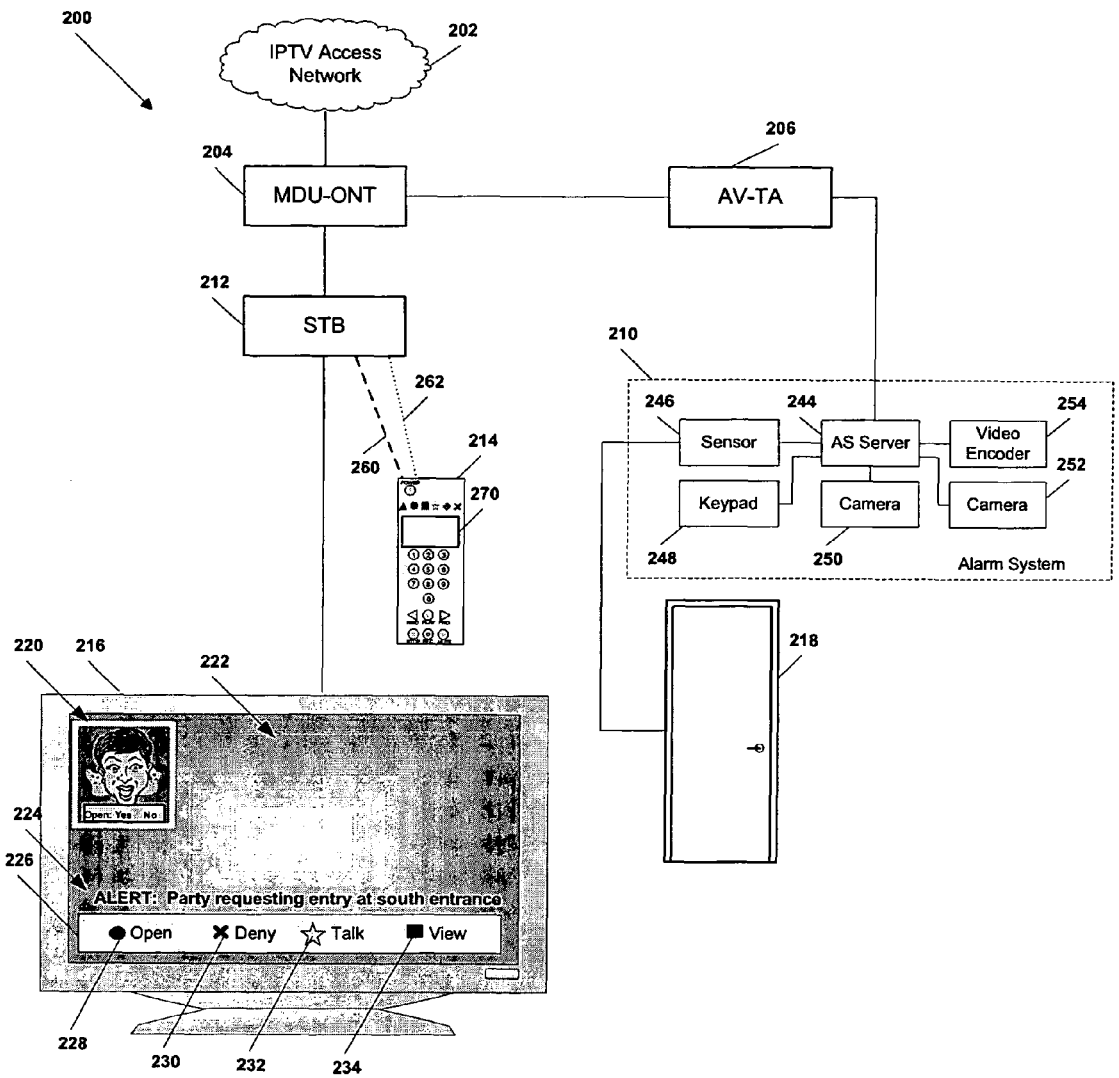
FIG. 2 is a block diagram of a second particular illustrative embodiment of a system to provide security monitoring.

Referring to FIG. 2, a second particular illustrative embodiment of a system to provide security monitoring is depicted and generally designated 200. The system 200 includes a multiple dwelling unit optical network terminal (MDU-ONT) 204 coupled to an internet protocol television (IPTV) access network 202. An audio video transport adaptor (AV-TA) 206 communicates with the MDU-ONT 204, and further communicates with an alarm system 210 coupled to an entryway 218, such as an entrance to an apartment complex.

In a particular embodiment, the alarm system 210 can include one or more sensors 246 and cameras 250, 252. The sensor 246 can be coupled to the entryway 218 so that the sensor 246 is activated when an unauthorized opening of the entryway 218 occurs. The alarm system 210 can also include a keypad 248 to allow a person desiring access to the entryway 218 to request access from an authorized user of the entryway, such as a tenant of the apartment complex.

A multimedia device 212, such as a set-top box (STB) can communicate with the IPTV access network 202 via the MDU-ONT 204 to receive video content such as television programming to display at a display device 216. The STB 212 can further receive security content from the alarm system 210 via the AV-TA 206 and the MDU-ONT 204. The STB 212 can send an alert 224 or video data 220 to display on the display device 216 in response to receiving a signal indicating a security event. A remote control device 214 can communicate wirelessly with the STB 212 via infrared (IR) signals 260, wireless internet protocol (IP) signals 262, other wireless technologies, or any combination thereof.

In an illustrative embodiment, a visitor to an apartment complex can approach the entryway 218. The camera 250 can generate video data of the visitor at the entryway 218, which can be encoded by the video encoder 254 and sent to the AV-TA 206. The visitor can press a key sequence at the keypad 248 indicating an apartment where the visitor desires to direct an access request.

The AV-TA 206 can designate the STB 212 to receive the video data according to the key sequence. The video data can be sent to the MDU-ONT 204 of the IPTV system, which directs the video data to the STB 212. The STB 212 can send an alert 224 to the display device 216 while a main viewing region 222 displays a television program received from the IPTV access network 202. The STB 212 can provide a user interface 226 that includes user-selectable commands 228, 230, 232, 234 related to the security event and corresponding to hotkeys of the remote control device 214. For example, the user can choose to open the entryway 218, deny access, talk to the visitor, or view the visitor by pressing a corresponding hotkey of the remote control device 214.

In an illustrative embodiment, the STB 212 can wirelessly transmit an alert to the remote control device 214 indicating the request to access the entryway 218. For example, the alert can cause an indicator such as a LED to display on the remote control device 214. Thus, a user of the remote control device 214 can be informed of the alert and respond to the alert without viewing or interacting with the display device 216.

In an illustrative embodiment, the video data 220 can overlay television or other content displayed at the display device 216 to provide a video representation of the person at the entryway 218. As an illustrative example, the STB 212 can display the video data 220 concurrently with displaying the alert 224. As another illustrative example, the STB 212 can display the video data 220 when the STB 212 receives a signal from the remote control device 214 to display the video data 220. In one embodiment, where the remote control device 214 also has a display screen 270, the STB 212 can provide video data corresponding to the security event to display at the remote control device 214, such as by a wireless IP transmission 262 via a wireless IP network interface (not shown) of the STB 212.

In a particular embodiment, the user of the STB 212 can indicate a desire to receive voice data from the visitor. The voice data can be received by a microphone (not shown) of the alarm system 212. The voice data can be converted to Voice over Internet Protocol (VoIP) data and can be sent to the STB 212. The voice data can be sent to the display device 216 to generate audio signals corresponding to the received voice data, for example, when the user selects a "talk" command indicated by indicator 232. The STB 212 can also transmit VoIP data corresponding to the security event to the remote control device 214, such as by via the wireless IP network interface (not shown) of the STB 212. Thus, the user of the remote 214 can also receive audio signals corresponding to the security event without interacting with the display device 216.

In another particular embodiment, the user of the STB 212 can also indicate a desire to view a security map in response to the security event. The STB 212 can send security data to display at the display device 216, or at a display screen 270 of the remote control 214, or both, in response to a selection of a command to display a security map indicating a location of the security event. For example, the security map can depict a map of the apartment complex, with the location of the entryway 218 highlighted as the location of the security event.

In an illustrative embodiment, the STB 212 can intelligently process the signal indicating the alert event when the signal includes a video stream and sensor data. The STB 212 can determine an alert level of the security event, such as by determining a location of an activated sensor 246 from the sensor data. The STB 212 can also inserting tagging data into the video stream. The tagging data can identify the user and indicate the time and date and the alert level of the security event, for example. The STB 212 can send the video stream including the tagging data to a remote storage device, such as a memory device of a computer coupled to the STB 212, a data store of the IPTV system, or another remote storage device, or any combination thereof.

Figure 3:
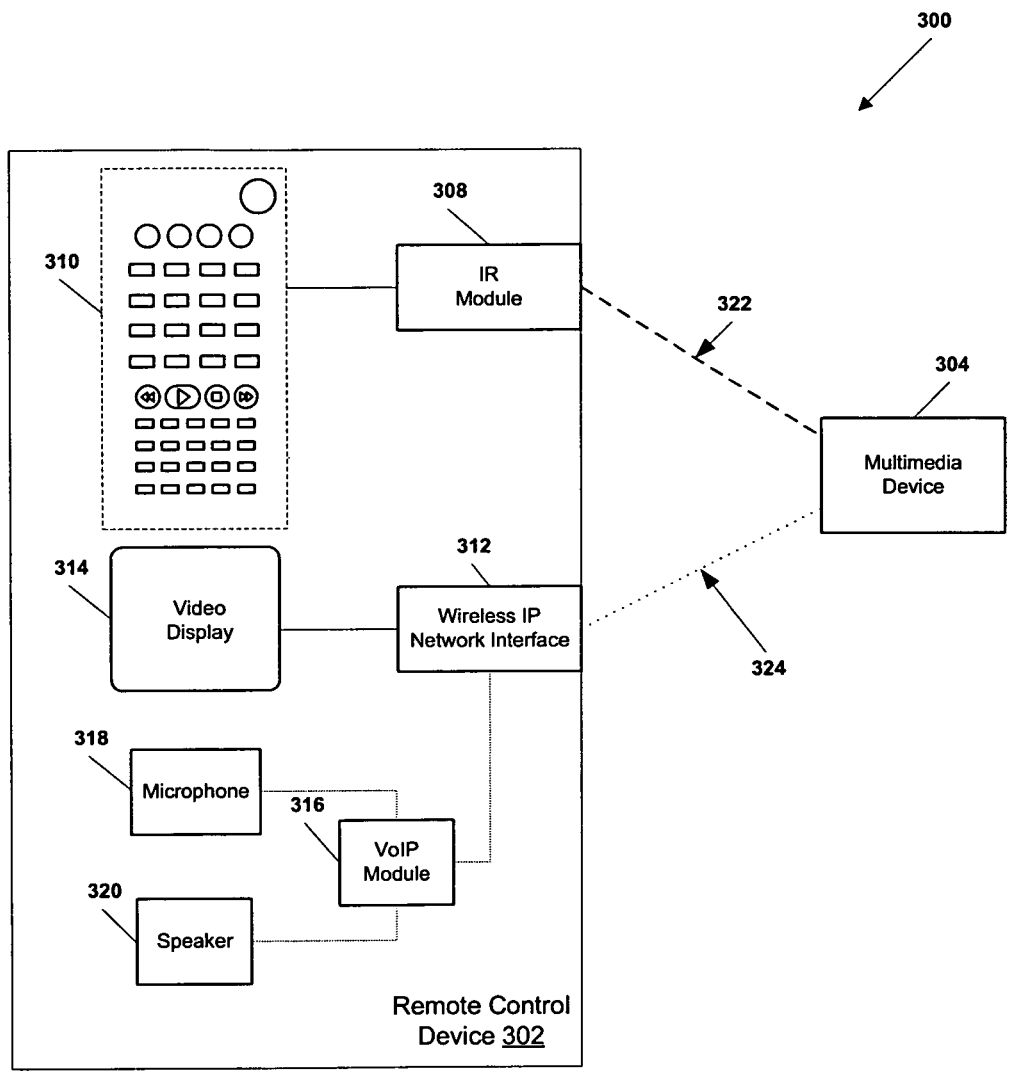
FIG. 3 is a block diagram of a third particular illustrative embodiment of a system to provide security monitoring.

Referring to FIG. 3, a third particular illustrative embodiment of a system to provide security monitoring is depicted and generally designated 300. A remote control device 302 is in wireless communication with a multimedia device 304, such as a set-top box. The remote control device 302 includes a plurality of user controls 310 to generate commands to control the multimedia device 304. In a particular, non-limiting embodiment, the remote control device 302 also includes an infrared transmission (IR) module 308 to wirelessly send a command signal to the multimedia device 304. The remote control device 302 includes a wireless internet protocol (IP) network interface 312 to wirelessly communicate with the multimedia device 304 via a wireless IP network.

In a particular embodiment, the remote control device 302 can include a speaker 320 and a microphone 318 that are coupled to a Voice-over-Internet Protocol (VoIP) module 316 to receive VoIP data via the wireless IP network interface 312, and to provide a corresponding audio signal to the speaker 320. The VoIP module 316 can be operable to send VoIP data to the multimedia device 304 corresponding to an audio signal received at the microphone 318. An integrated video display 314 is coupled to the wireless IP network interface 312. The video display 314 can display video data received by the remote control from the multimedia device 304.

In an illustrative embodiment, the remote control device 302 can interact with the multimedia device 304 via IR transmission 322, or via wireless IP transmission 324. The IR transmission 322 can generally transmit commands to control an operation of the multimedia device 304. For example, the commands transmitted via the IR module 308 can include a channel change selection, a power off selection, or the like, or any combination thereof. In contrast, data communicated between the remote control device 302 and the multimedia device 304 via the wireless IP network interface 312 can include video content for the video display 314, VoIP data for the speaker 320, VoIP data generated by signals received at the microphone 318, or any combination thereof.

In a particular embodiment, the remote control device 302 can be used in conjunction with a security system, such as the system 200 depicted in FIG. 2. For example, one of the user controls 310 can generate a command to the multimedia device 304 that authorizes access to the entryway 218 when the VoIP data received at the remote control device 302 corresponds to a request for access to the entrance 218. In one embodiment, the VoIP module 316 can be operable to provide a distinctive ring signal at the speaker 320 when the request for access to the entryway 218 is received.

A party can thus approach the entryway 218 and activate a control on the keypad 248 to designate a request to the user of the set-top box 212 for access into the entryway 218. The set-top box 212 can transmit via infrared signal the notification to the remote control device 320 of the request for access to the entryway. A user of the remote control device 302 can activate a control 310 indicating a desire to receive the VoIP data from the person at the entryway 218. Audio data can then transmitted from the set-top box 212 to the remote control device 302 corresponding to audio data captured by a microphone at the entryway 218.

In a particular embodiment, a user of the remote control device 302 can hear speech at the remote control 302 corresponding to the person outside the entryway 218, without the necessity of interacting with the display device 216. The user of the remote control device 302 can receive video data corresponding to a video signal acquired by the alarm system 210. The video data can be from a video camera such as the camera 250, and the video data can be received concurrently with VoIP data, to display an image on the video display 314 and reproduce a voice signal at the speaker 320 of the person at the entryway 218.

Figure 4:
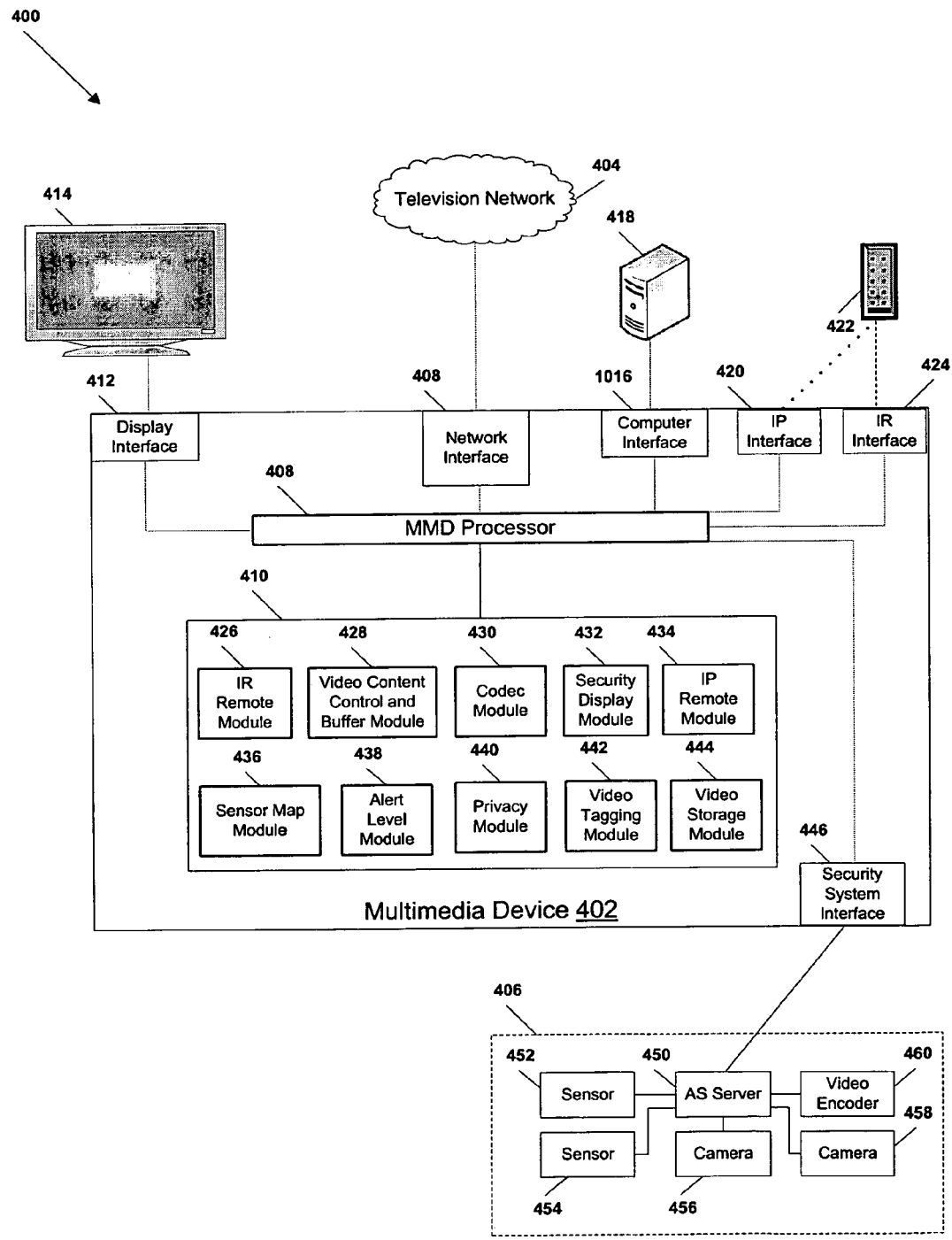
FIG. 4 is a block diagram of a fourth particular illustrative embodiment of a system to provide security monitoring.

Referring to FIG. 4, a fourth particular illustrative embodiment of a system to provide security monitoring is depicted and generally designated 400. The system 400 includes a television network 404 coupled to a multimedia device 402. The multimedia device 402 communicates with an alarm system 406.

The multimedia device 402 can include a display interface 412 to communicate with a display device 414, such as a television monitor. The multimedia device 402 can further include a network interface 408 to communicate with a television network 404, a computer interface 416 to communicate with a computer 418, a wireless internet protocol (IP) interface 420 to wirelessly communicate with a remote control device 422, and an infrared (IR) interface 424 to also wirelessly communicate with the remote control device 422. In a particular embodiment, the multimedia device 402 can include a security system interface 446 to receive security data from a security system, such as the alarm system 406. The multimedia device 402 includes a processor 409 and a memory device 410.

The multimedia device 402 can include a video content control and buffer module 428. The video content control and buffer receives and stores video content from the television network. The multimedia device 402 can include a coder-decoder (codec) module 420 to decode the video content received from the television network 404.

In a particular embodiment, the memory device 410 can include a security display module 432 that is executable by the processor 409 to selectively send a first alert, such as a video signal, a notification, or a combination thereof, to display at the display device 414 when signal is received indicating a security event. For example, the security event can be an activated security sensor, such as the sensor 452 of the alarm system 406. As an example, the activated security sensor 452 can indicate an open portal, such as a doorway, window, or the like, or any combination thereof. As another example, the security event can be detected by an output of cameras 456, 458 of the alarm system 406. As an illustrative example, a recognized image or data pattern, such as a person's face, a muzzle flash of a discharged firearm, or other event, can be identified in an output of a camera 456, 458 and can indicate the security event.

In a particular embodiment, the memory device 410 can include a sensor map module 436 that is executable by the processor 409 to correlate a security camera with a sensor. For example, the camera 456 can have a field of view that includes the sensor 452, and the camera 458 can have a field of view that includes the sensor 454. Thus, the sensor map module 436 can correlate an activation of the sensor 452 with the camera 456, and an activation of the sensor 454 with the camera 458. Of course, multiple cameras 456, 458 can be correlated to a single sensor 452, 454, or multiple sensors 452, 454 can be correlated to a single camera 456, 458. The security display module 432 can send a video signal corresponding to a security camera 456, 458 correlated to an activated sensor 452, 454 to display at the display device 414. For example, an activation of the sensor 454 can result in a display at the display device 414 of video content produced by the camera 458.

In a particular embodiment, the memory device 410 can include an alert level module 438 that is executable by the processor 409 to determine an alert level of a security event. The alert level module 438 can be responsive to a user alert setting. For example, a user can set a user alert setting to designate an activation of one sensor 452 as a low alert level, while an activation of another sensor 454 can be designated as a high or critical alert level by the user setting. The security display module 432 can be further operable to determine the display at the display device 414 according to the alert level. For example, the security display module 432 can determine a notification at the display device in response a low alert level, while a video feed can be automatically displayed at the display device 414 in response to a high alert level or a critical alert level.

In a particular embodiment, the memory device 410 can include a privacy module 440 that is executable by the processor 409 to determine a privacy category of a security event. The privacy module 440 can be responsive to a user setting. For example, a sensor 450 can be located in a public area such as a hallway, and another sensor 454 can be located in a private area, such as a bedroom. The user setting of the privacy module 440 can thus designate a security event corresponding to an activation of the sensor 452 as having a "public" privacy category, while a security event correlated to activation of the sensor 454 can be designated as having a "private" privacy category.

In a particular embodiment, the memory device 410 can include a video tagging module 442 that is executable by the processor 409 to associate tagging data to a portion of video data corresponding to the security event. The tagging data can include one of at least of an alert level and a privacy category of the security event. The tagging data can also include processor instructions such as script or compiled code that can be executed by a processor while the associated video data is received, processed, or displayed, for example. As an example, the tagging data can provide searchable or indexable supplementary data within the video data steam, and can further include instructions to control a display of the data by a multimedia device processing the data. The tagging data can also include time, date, and other environmental data, allowing simple synchronization when playing back multiple video streams.

In a particular embodiment, the memory device 410 can include a video storage module 444 that is executable by the processor 409 to selectively store the video data and the tagging data at a memory device. For example, the memory device can be the memory device 410 of the multimedia device 402. As another example, the memory device can be a digital video recorder (DVR) (not shown) of the multimedia device 402. As another example, the memory device can be a memory device of a computer 418 coupled to these multimedia device 402 via the computer interface 416.

In a particular illustrative embodiment, the video storage module 444 can be responsive a user video storage setting. For example, the user video storage setting can indicate that the video data is to be recorded when a critical security level has been determined. As another example, the user video storage setting can determine that video data should be stored when a security event is determined to have a "public" privacy category but not stored when a security event is determined to have a "private" privacy category.

In a particular embodiment, the memory device 410 can include an IR remote module 434 that is executable by the processor 409 to control wireless communications with a remote control device 422 via the IR interface 424. In a particular embodiment, the multimedia device 402 may send an alert to the remote control device 442 indicating the security event. In a particular embodiment, the multimedia device 402 can include a wireless IP network interface 420, and the memory device 410 can include an IP remote module 434. The IP remote module 434 can be executable by the processor 409 to selectively send VoIP data corresponding to audio data associated with a security event to the remote control 422 via the wireless IP network interface 420. The IP remote module 434 can be executable to selectively send the VoIP data when the security event includes receiving a request from a network terminal to access an entryway at a security system that communicates with a network terminal via an audio/video transport system, such as the AV-TA 206 depicted in FIG. 2.

Figure 5:
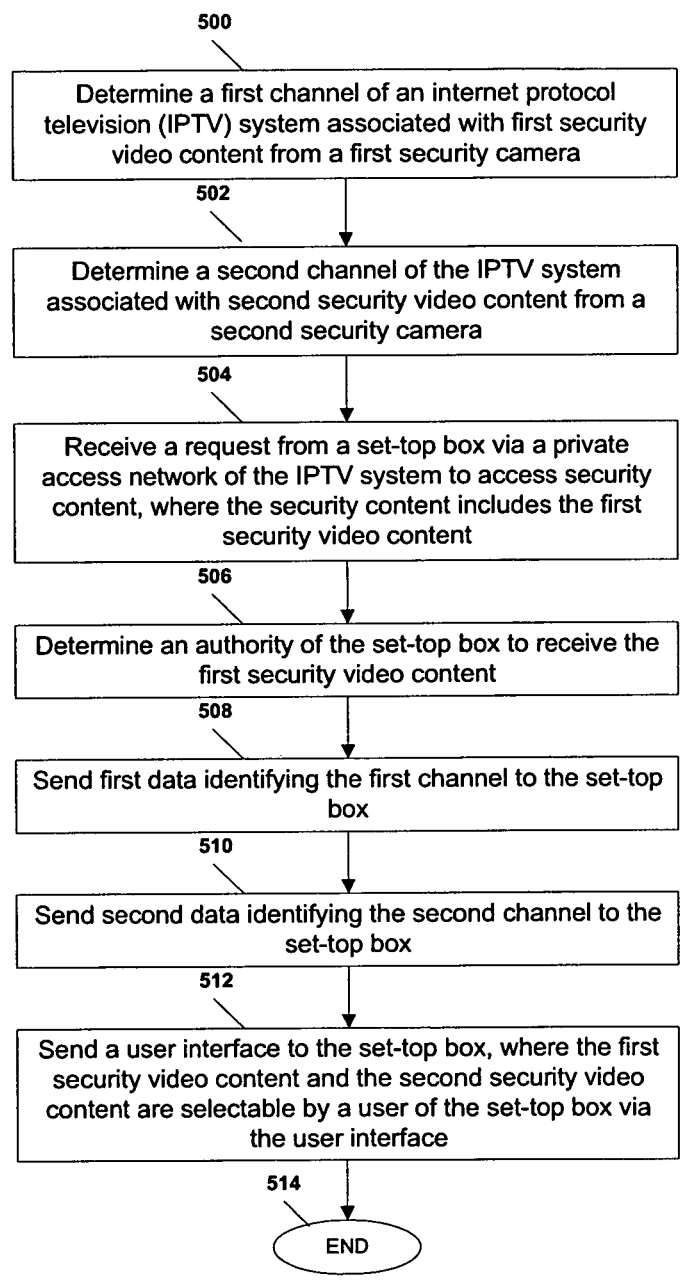
FIG. 5 is a flow diagram of a particular illustrative embodiment of a method of providing security monitoring.

Referring to FIG. 5, a particular illustrative embodiment of a method of providing security video data is depicted. At block 500, a server determines a first channel of an internet protocol television (IPTV) system associated with a first security video content from a first security camera. Continuing to block 502, the server determines a second channel of the IPTV system associated with second security video content from a second security camera. As an illustrative example, the IPTV system can be the system depicted in FIG. 1, and the first security camera can be the camera 136 of the first alarm system 128. Further, the second security camera can be the camera 152 of the second alarm system 142. The video feed from the cameras 138, 152 can be encoded by video encoders 140, 154 and transmitted to the MSA distribution point 108 via the second IP network 114. The first security video content and the second security video content can be stored at the remote video application server 110. The channel content application server 104 can determine the first channel associated with the first security video content and the second channel associated with the second security video content for access by the set-top box 116.

Moving to block 504, a request is received from a set-top box via a private access network of the IPTV system to access security content, where the security content includes the first security video content. For example, a user of the set-top box 116 in FIG. 1 can send a request to the remote video application server 110 for the first security video content captured by the camera 138.

Proceeding to block 506, an authority of the set-top box to receive the first security video content is determined. As an illustrative example, the authority of the set-top box can be determined via an identification of the set-top box, or an identification of the user of the set-top box. The user of the set-top box can be authenticated such as by providing a password or biometric signature. As another example, the set-top box can be authenticated by a media access control (MAC) address of the set-top box. In the embodiment shown in FIG. 1, for example, data corresponding to the authentication can be sent from the set-top box 116 to the remote video application server 110. The remote video application server 110 can compare the authentication data to a list or database of authorized users, or can query another data store such as subscriber database or a security system database.

Continuing to block 508, the server sends first data identifying the first channel to the set-top box. At block 510, the server sends second data identifying the second channel to the set-top box. At block 512, in an illustrative embodiment, a user interface can be sent to the set-top box, where the first security video content and the second security video content are selectable by user of the set-top box via the user interface. As an illustrative example, the first data and the second data can be depicted as channel numbers on the user interface at a display device connected to the set-top box. As another illustrative example, the first data and the second data can be depicted as images, icons, thumbnails, or the like, or any combination thereof. The method terminates at 514.

In a particular embodiment, a user selection of the first security video content at the user interface determines an internet group management protocol (IGMP) join request to the IPTV system from the set-top box. As an illustrative example, a user of the set-top box 116 of FIG. 1 can select via the remote control 120 to view the first security video data at the display device 118. Upon receiving the user selection, the STB 116 can transmit an IGMP join request to IPTV system via the IP network 114. The IGMP join can request a multicast internet protocol (IP) address to receive the selection of the first security video content.

In another particular embodiment, when the IPTV system is configured to provide the first security video content via IP unicast, a user selection of the first security video content can determine a request for a unicast IP address to receive the selection of the first security video content from a video-on-demand (VOD) server. For example, the VOD streaming video server 112 can replicate the video stream of the first security video data for an IP unicast to the set-top box 116.

Figure 6:
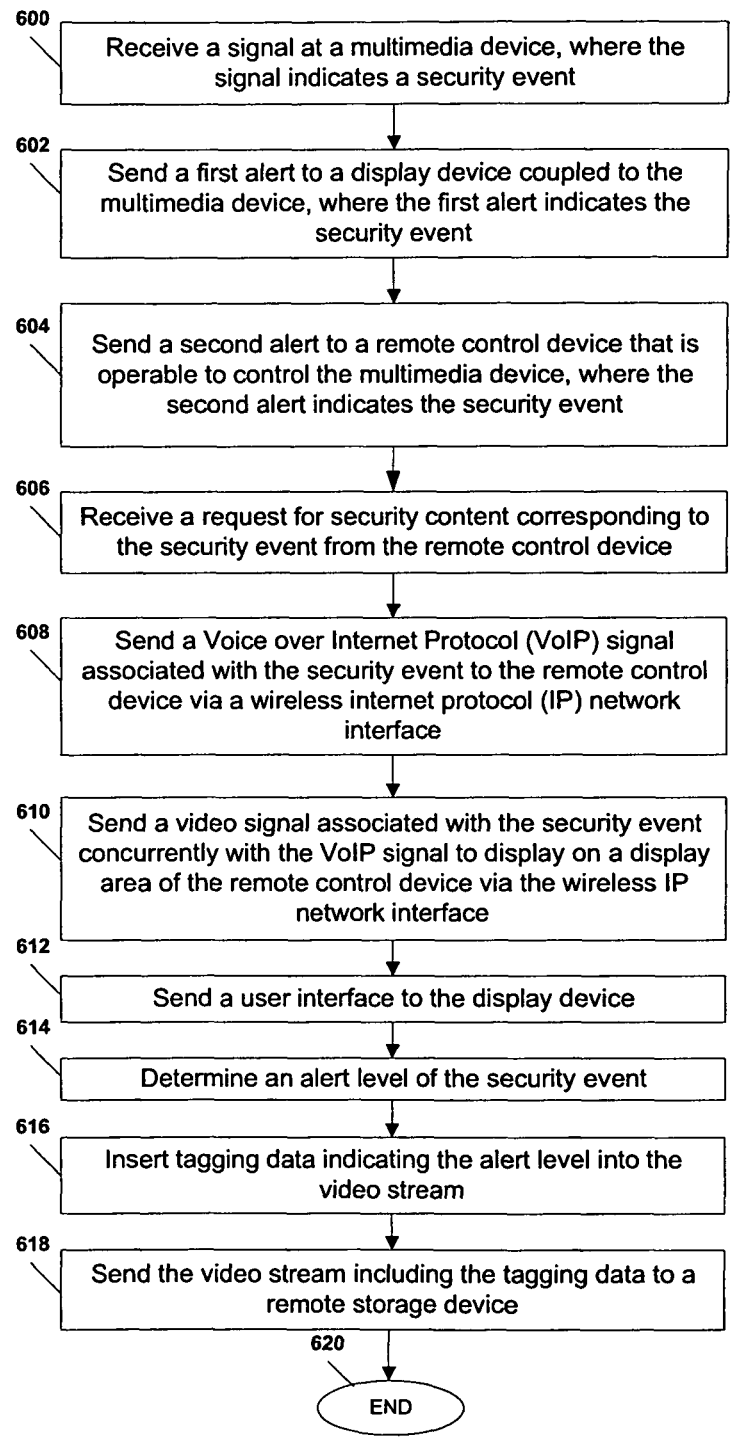
FIG. 6 is a flow diagram of a second particular illustrative embodiment of a method of providing security monitoring.

Referring to FIG. 6, a second particular illustrative embodiment of a method of providing security monitoring is depicted. At block 600, a signal is received at a multimedia device, where the signal indicates a security event. Moving to block 602, a first alert is sent to a display device coupled to the multimedia device, where the first alert indicates the security event. At block 604, a second alert is sent to a remote control device that is operable to control the multimedia device, where the second alert indicates the security event.

As an illustrative example referring to the system 200 in FIG. 2, the STB 212 can receive a signal indicating a security event, such as a visitor at the entryway 218 requesting access via the keypad 248. The multimedia device 212 can send a first alert 224 indicating the security event to the display device 216. The multimedia device can also send a second alert indicating the security event to the remote control 214 via an IR transmission 260, so that a user of the remote control can be informed of the security event even if the display device 216 is turned off.

Proceeding to block 606, in a particular embodiment, a request for security content corresponding to the security event is received from the remote control device. At block 608, in a particular embodiment, a Voice over Internet Protocol (VoIP) signal associated with the security event is sent to the remote control device via a wireless internet protocol (IP) network interface. Advancing to block 610, a video signal associated with the security event can be sent to the remote control device via the wireless IP network interface, and the video can be displayed on a display area of the remote control device.

For example, the STB 212 can receive a command from the remote control device 214 to receive audio and video content received from the alarm system 210. The STB 212 can send VoIP data and video data to the remote control device 214 corresponding to audio and visual content captured by the alarm system 210 at the entryway 218. A user of the remote control device 214 can therefore see and hear the visitor requesting access to the entryway 218 without interacting with the display device 216. For example, the display device 216 can be turned off, or can be in a location out of visual and audible range of the user, but the user can be able to respond to the security event via the video and audio information received at the remote control device 214 from the STB 212.

Proceeding to block 612, in an illustrative embodiment, a user interface can be sent to the display device. For example, the STB 212 can send the user interface 226 to display on the display device 216. Moving to block 614, an alert level of the security event can be determined. Proceeding to block 616, tagging data indicating the alert level can be inserted into the video stream. Continuing to block 618, the video steam including the tagging data can be sent to a remote storage device. The method terminates at block 620.

As one example, the alert level can be determined based on processing instructions of the STB 212, such as by looking up a table of user security settings for an alert level associated with a visitor requesting access to the entryway 218. A user of the STB 212 that frequently entertains can designate a "low" alert level for an entryway access request, while a user that never receives guests can designate a "high" or "critical" alert level for an entryway access request. The alert level can also be determined by the user of the STB 212 during or after the security event. The STB 212 can send the tagged video stream data to a dedicated security data storage unit for the apartment complex for later retrieval.

Figure 7:
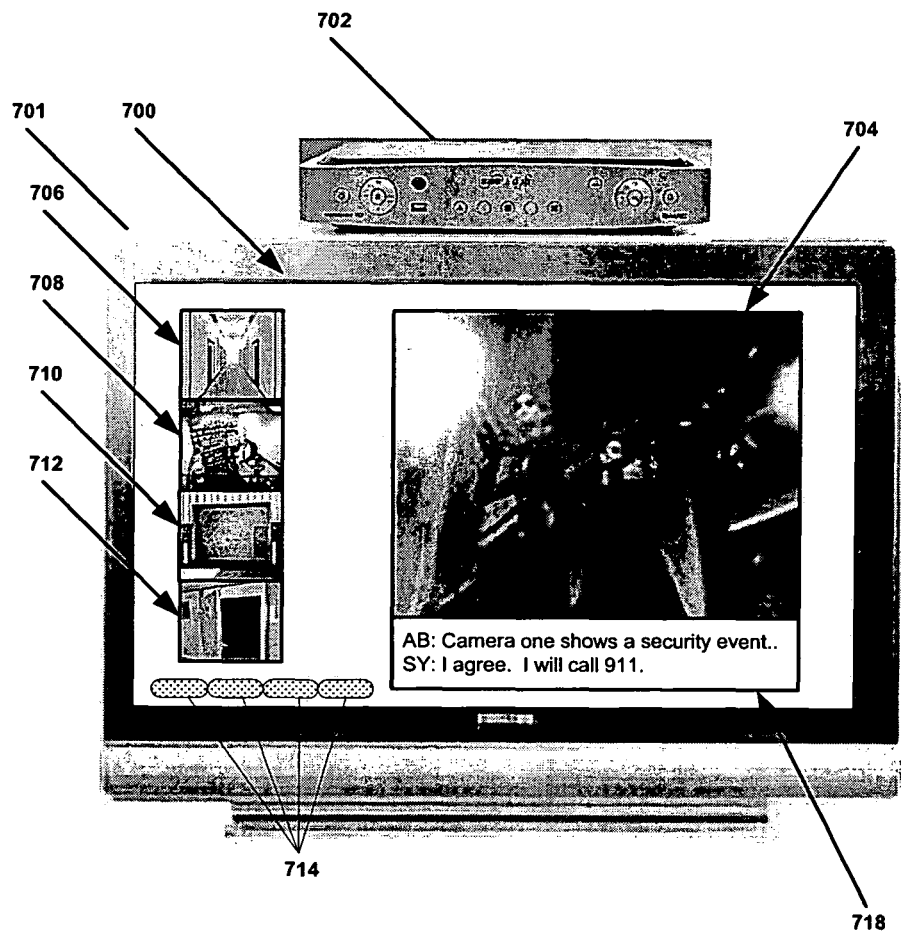
FIG. 7 is a diagram of a particular illustrative embodiment of a graphical user interface to provide security monitoring.

Referring to FIG. 7, a particular illustrative embodiment of a graphical user interface (GUI) to provide security monitoring is shown and generally depicted at 700. The GUI 700 is displayed on a display device 701. The display device 701 can be coupled to a multimedia device 702, such as a set-top box, that communicates with a television network, such as an Internet Protocol television (IPTV) network. The GUI 700 can have a first viewing region 704 to display security video content received from the television network.

In a particular embodiment, the GUI 700 can include selectable indicators 706, 708, 710, 712 related to available security data received via the television network. For example, the security data indicated by the indicators 706, 708, 710, 712 can include sensor data, video data, other data, or any combination thereof. In an illustrative embodiment, in response to a selection of an indicator 706, 708, 710, 712 the set-top box can send a request to a server of the IPTV network to receive the corresponding security data. The received security data can be displayed in the first viewing region 704, for example, or can be displayed in another viewing region, or a new viewing region. In another embodiment, a selection of one of the indicators 706, 708, 710, 712 can cause the GUI 700 to be removed from the display and to be replaced with the received security content. Although depicted as thumbnails, the indicators 706, 708, 710, 712 can be displayed as channel numbers, icons, textual descriptions or labels, icons, images, other indicators, or any combination thereof.

In a particular embodiment, the GUI 700 can include controls 714 to control an operation of the interface. The user controls 714 can include a selectable control associated with an operation of a security system. The user controls 714 can include a selectable control associated with an operation of the television network. In a particular illustrative embodiment, a selection of a user control 714 can cause the set-top box to send a request to a server of the IPTV network to provide security video data related to a second security event to display in the display area 704. In another particular illustrative embodiment, a selection of a user control 714 can cause the set-top box to send a request to a server of the IPTV network to forward the video content to another set-top box.

In an illustrative embodiment, the indicators 706, 708, 710, 712 and the controls 714 can be navigable and selectable via typical interface navigation and control mechanisms. For example, a remote control device can enable navigation and selection of elements of the GUI 700 with navigation keys and a selection key. Other illustrative examples can include a pointing device, keyboard, or voice recognition system.

The user interface 700 can include a text messaging interface 718 to communicate with a second set-top box that is also authorized to receive at least some of the security video content available to the user of the GUI 700. In a particular example, data communicated via the text messaging interface 718 can be stored at a server or other device of the IPTV system. In another example, the text messaging interface 718 data can be stored at a memory device local to the multimedia device 702, such as a flash memory, a hard drive, a digital video recorder (DVR), or the like, or any combination thereof.

In a particular embodiment, a user control 714 can be an event-based notification control to control the behavior of the set-top box when a security event associated with security content is determined. For example, a security event associated with the security video content displayed on the GUI 700 at display region 704 can be an activated sensor of an alarm system. The alarm system can further include a camera providing the security video content displayed in display region 704. A user can select a user control 714 so that, upon receiving notification that the activated sensor has been activated, the set-top box automatically changes the security video data displayed in display area 704 to video data from a second video source, such as a second video camera, that has a particular field of view of the activated sensor.

Figure 8:
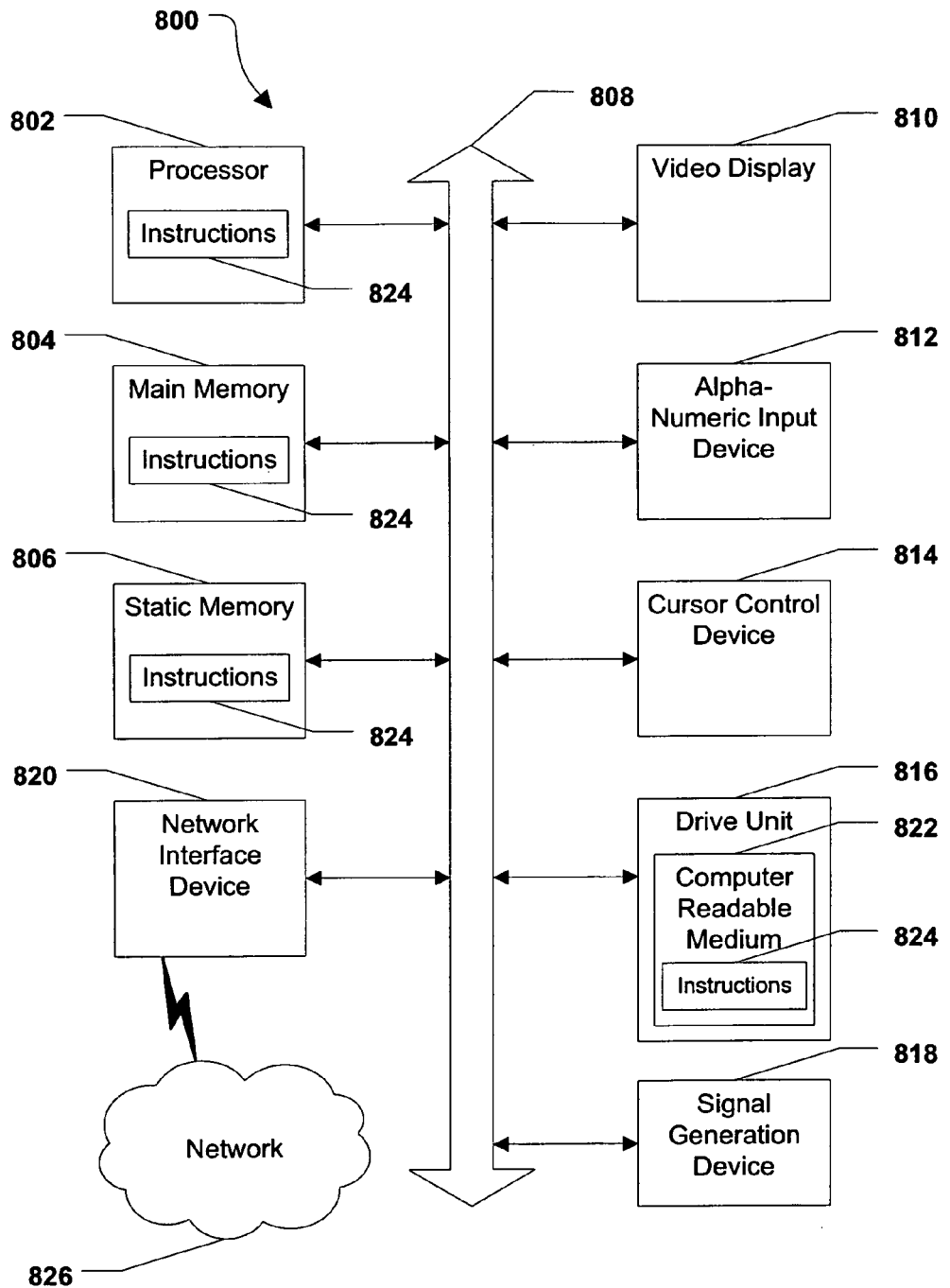
FIG. 8 is a diagram of an embodiment of a general computer system.

Referring to FIG. 8, an illustrative embodiment of a general computer system is shown and is designated 800. The computer system 800 can include a set of instructions that can be executed to cause the computer system 800 to perform any one or more of the methods or computer based functions disclosed herein. The computer system 800, or any portion thereof, may operate as a standalone device or may be connected, e.g., using a public network or a private network within an IPTV system, to other computer systems or peripheral devices, such as a server or STB, as shown in FIG. 1.

In a networked deployment, the computer system may operate in the capacity of a server, such as the remote video application server of FIG. 1, or as a client user computer in a server-client user network environment, or as a peer computer system in a peer-to-peer (or distributed) network environment. The computer system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics processing unit (GPU), or both. Moreover, the computer system 800 can include a main memory 804 and a static memory 806 that can communicate with each other via a bus 808. As shown, the computer system 800 may further include a video display unit 810, such as a liquid crystal display (LCD), an organic light emitting diode (OLED), a flat panel display, a solid state display, or a cathode ray tube (CRT). Additionally, the computer system 800 may include an input device 812, such as a keyboard, and a cursor control device 814, such as a mouse. Further, the computer system 800 can include a wireless input device 815, e.g., a remote control device. When the computer system 800, or any portion thereof, is embodied in a set-top box device, the cursor control device 814 can be a remote control device. The computer system 800 can also include a disk drive unit 816, a signal generation device 818, such as a speaker or remote control, and a network interface device 820.

In a particular embodiment, as depicted in FIG. 8, the disk drive unit 816 may include a computer-readable medium 822 in which one or more sets of instructions 824, e.g. software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 824 or receives and executes instructions 824 responsive to a propagated signal, so that a device connected to a network 826 can communicate voice, video or data over the network 826. Further, the instructions 824 may be transmitted or received over the network 826 via the network interface device 820.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In conjunction with the configuration of structure described herein, the system and method disclosed may receive a signal at a multimedia device indicating a security event, send a first alert to a display device, and send a second alert to a remote control device. A first channel of an Internet Protocol television (IPTV) system associated with first security video content can be determined, a request received from a set-top box to access security content including the first security video content, and data sent to the set-top box identifying the first channel. A multimedia device may include a processor and a memory that includes instructions executable by the processor to receive security data from a security system and send at least one of a video signal and a notification to display at a display device when a security event is detected.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
receiving a signal at a media device associated with a user via an alarm system server of an alarm system, wherein the signal indicates a security event;
determining a user-defined privacy level associated with the signal based on comparing an identifier of a source of the signal to settings defined by the user, wherein the settings map the identifier of the source to a corresponding privacy level;

storing, with the media device, a video feed associated with the signal to a storage device in response to a determination that the user-defined privacy level is public, wherein the media device does not store the video feed to the storage device in response to a determination that the user-defined privacy level is private;

sending, from the media device, a first alert to a display device coupled to the media device and a second alert to a display portion of a remote control device associated with the media device, wherein the first alert and the second alert indicate the security event, and wherein the second alert enables a user to reply to the security event without the user viewing or interacting with the display device; and sending selectable command options to the display device from the media device for concurrent display on the display device with the first alert, the selectable command options associated with responses to the security event.

2. The method of claim 1, wherein the remote control device is configured to wirelessly communicate user input to the media device to control media content sent by the media device to the display device, wherein the media content comprises content of a television channel received via a video headend, and wherein the selectable command options include a first command option to allow entry and a second command option to deny entry, and wherein the media device is configured to receive particular user input that selects a command option of the selectable command options via the remote control device.

3. The method of claim 1, wherein the signal is received via an access network of an internet protocol television system.

4. The method of claim 3, wherein the first alert overlays video content at the display device, and wherein the video content is received from the internet protocol television system.

5. The method of claim 1, further comprising:
receiving selection of a particular command option of the selectable command options via the remote control device; and
implementing the particular command option.

6. The method of claim 1, wherein the security event corresponds to a request for entry at a particular entrance to a building associated with the media device, wherein the request for entry includes a key sequence entered via a keypad.

7. The method of claim 6, wherein the selectable command options comprise a particular option to enable audio communication between the user and a person at the particular entrance.

8. The method of claim 6, wherein the selectable command options comprise a particular option to send a security map indicating a location of the particular entrance to the display device.

9. The method of claim 1, wherein the signal includes a video stream and sensor data.

10. The method of claim 1, further comprising:
determining an alert level of the security event; and
inserting tagging data indicating the alert level into the video feed to be recorded when the user-defined privacy level is public.

11. The method of claim 1, wherein determining the user-defined privacy level is based on a particular sensor of a plurality of sensors, the particular sensor indicating the security event, wherein the particular sensor is associated with a particular location associated with the alarm system.

12. The method of claim 1, wherein the security event comprises an activated sensor indicating an open portal.

13. A media device, comprising:
a processor and a memory device accessible to the processor;
wherein the memory device includes instructions executable by the processor to perform operations including:
receiving a signal indicating a security event via an alarm system server;
determining a user-defined privacy level associated with the signal based on comparing an identifier of a source of the signal to settings defined by a user, wherein the settings map the identifier of the source to a corresponding privacy level;
storing a video feed associated with the signal to a storage device in response to a determination that the user-defined privacy level is public;
determining to not store the video feed in response to a determination that the user-defined privacy level is private;
sending, a first alert to a display device coupled to the processor and a second alert to a remote control device associated with the media device, wherein the first alert and the second alert indicate the security event, and wherein the second alert enables a user to reply to the security event without the user viewing or interacting with the display device; and
sending selectable command options to the display device for concurrent display on the display device with the first alert, the selectable command options associated with responses to the security event.

14. The media device of claim 13, wherein the operations further include:
receiving a second signal that indicates that an entrance is open;
sending an indication that the entrance is open to the display device; and
enabling text messaging with a user of another device that received the second signal.

15. The media device of claim 13, wherein the operations further comprise:
determining an alert level associated with the signal; and
determining video content to display at the display device based on the alert level.

16. The media device of claim 15, wherein the operations further comprise inserting tagging data in the video feed when the video feed is recorded, and wherein the tagging data includes the alert level, wherein the tagging data indicates the user-defined privacy level.

17. The media device of claim 13, wherein the operations further comprise accessing the settings at the memory device.

18. The media device of claim 13, wherein the security event corresponds to a request for entry, wherein the remote control device is configured to wirelessly communicate user input to the media device to control media content sent by the media device to the display device, wherein the media content comprises content of a television channel received via a video headend, and wherein the selectable command options include a first command option to allow entry and a second command option to deny entry, and wherein the media device is configured to receive particular user input that selects a command option of the selectable command options via the remote control device.

19. The media device of claim 13, wherein the security event is detected based on an image pattern or a data pattern, or both, including identifying a person's face, a muzzle flash of a discharged firearm, or both.

20. A computer-readable storage device comprising instructions executable by a processor to perform operations including:
  receiving a signal via an alarm system server of an alarm system, wherein the signal indicates a security event;
  determining a user-defined alert level associated with the signal based on settings defined by a user;
  storing a video feed associated with the signal to a storage device in response to a determination that the user-defined alert level corresponds to a critical security level; and
  when the user-defined alert level is lower than the critical security level:
    determining a user-defined privacy level associated with the signal based on comparing an identifier of a source of the signal to the settings, wherein the settings map the identifier of the source to a corresponding privacy level;
    storing the video feed to the storage device in response to a determination that the user-defined privacy level is public;
    determining to not store the video feed in response to a determination that the user-defined privacy level is private;
    sending a first alert to a display device coupled to the processor and a second alert to a display portion of a remote control device, wherein the remote control device conveys user input associated with media content received via a video headend to the processor, and wherein the first alert and the second alert indicate the security event; and
    sending selectable command options to the display device for concurrent display on the display device with the first alert, the selectable command options associated with responses to the security event.

21. The computer-readable storage device of claim 20, wherein the operations further include receiving the user input from the remote control device via infrared signals, wireless internet protocol signals, or both.

22. The computer-readable storage device of claim 20, wherein the signal is received via an access network of a content provider system, and wherein the signal includes information identifying a source of the signal, and wherein the user-defined privacy level is determined based on the source and the settings.

23. The computer-readable storage device of claim 22, wherein the first alert overlays video content at the display device, and wherein the video content is received from the access network.

24. The computer-readable storage device of claim 20, wherein the operations further include:
  receiving selection of a particular command option of the selectable command options via the remote control device; and
  implementing the particular command option.

25. The computer-readable storage device of claim 20, wherein the security event corresponds to a request for entry at a particular entrance to a building associated with the media device.

26. The computer-readable storage device of claim 20, wherein the signal includes a video stream and sensor data.

27. The computer-readable storage device of claim 20, wherein the operations further comprise inserting tagging data in the video feed when the video feed is recorded, and wherein the tagging data includes the alert level, the user-defined privacy level, or both.

28. The computer-readable storage device of claim 20, wherein the operations further comprise sending an internet group management protocol join request to an internet protocol television system, the join request associated with a multicast internet protocol address to receive selection of the video feed.

* * * * *